Aug. 4, 1931.   C. C. HANSEN   1,817,308

STEEL SUPPORT FOR ROCK DRILLS

Filed Feb. 20, 1929

INVENTOR.
Charles C. Hansen.
BY
HIS ATTORNEY.

Patented Aug. 4, 1931

1,817,308

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

STEEL SUPPORT FOR ROCK DRILLS

Application filed February 20, 1929. Serial No. 341,309.

This invention relates to rock drills, but more particularly to steel supports for rock drills.

One object of this invention is to protect the chuck parts and more particularly the chuck bushing against the thrust of the drill steel and the wear occasioned thereby. This is particularly advantageous when drilling prospecting holes where drills of great length are employed. When drilling for prospecting purposes it is not unusual to drill holes of 75 feet or more in length and frequently in an upward direction. When so used the weight of the long drill steel bears heavily against the chuck bushing and causes much wear and usually failure after a brief period of usage.

Another object of this invention is to convey water to the hollow drill steels used without carrying the water through the working parts of the drill. This is particularly desirable in the type of drilling mentioned above as the pressure of the cleansing water used for flushing the drill hole is frequently greater than the pressure of the compressed air used in drilling. Under such conditions the cleansing water will run back into the reciprocating parts of the drill washing off the lubricant and causing trouble in the operation of the drill.

Figure 1:
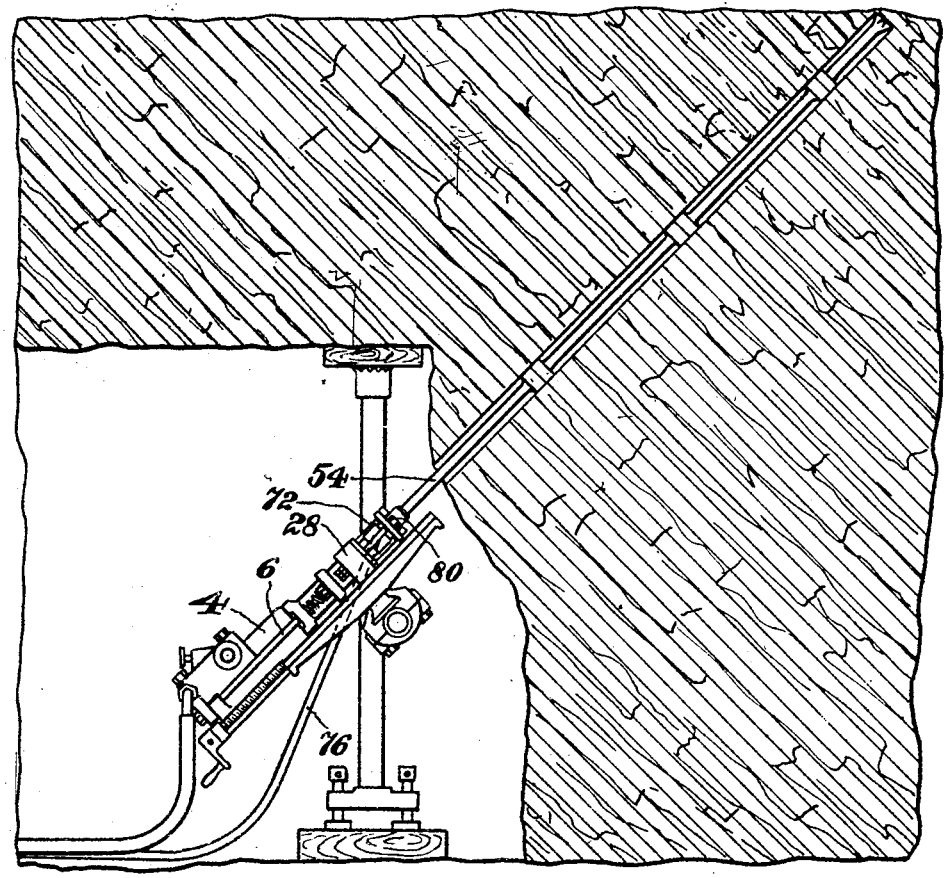
Figure 2:
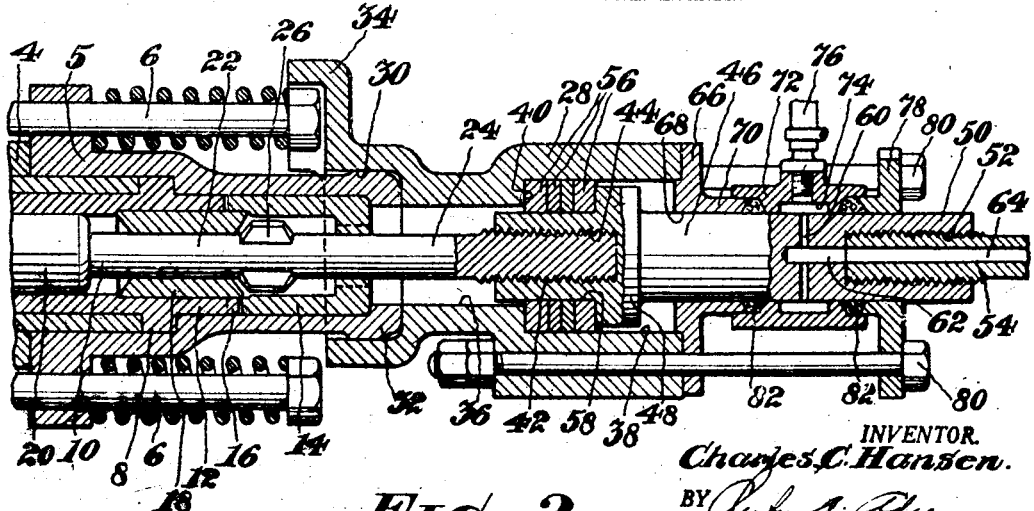

The objects above mentioned are obtained by the mechanism shown in the accompanying drawings, in which Figure 1 shows a rock drill in the operation of drilling an up-hole of great length, and Figure 2 is a cross sectional view of the front end of a rock drill with the steel support attached thereto.

Referring more particularly to the drawings, 4 designates the cylinder of a rock drill having a front head 5 attached thereto by means of the usual side bolts 6. A chuck 8 for conveying rotary motion to the drill steel 10 from the rotation mechanism (not shown) is placed in the front head. The chuck 8 consists of two portions, a rearward part 12 and a forward part 14 attached to the part 12 by a dove tail joint 16. A chuck bushing 18 serves to centralize the drill steel 10 with respect to the chuck 8. A piston 20, only the front end of which is shown, strikes the drill steel 10 when the drill is in operation. The drill steel shown comprises a shank 22 and a body portion 24. The shank 22 extends rearwardly into the chuck bushing 18 and between the shank 22 and the body portion 24 are formed wings 26 adapted to engage the chuck 8 for preventing relative rotation between the chuck 8 and the drill steel 10.

A cap 28 of substantially cylindrical shape is provided with an aperture 30 to receive the front end 32 of the front head 5. A hollow rearwardly extending projection 34 of the cap 28 is adapted to fit over one of the side bolts 6 and thus prevent relative rotation between the cap 28 and the front head 5. The cap 28 has a central bore 36 of relatively small diameter which opens from the aperture 30 and also an enlarged bore 38 communicating with the bore 36. Between the bores 36 and 38 a shoulder 40 is formed.

The front end of the drill steel 24 is threaded as at 42 to enter an internally threaded bore 44 in a coupling 46. The coupling 46 is provided with a collar portion 48 and an extension 50 which has an internally threaded portion 52 adapted to receive a correspondingly threaded section of a hollow drill steel 54. Thrust collars or friction rings 56 having apertures 58 to snugly receive the coupling 46 are interposed between the collar 48 of the coupling and the shoulder 40 of the cap 28 and form a closure for the rear end of the enlarged bore 38. The thrust collars 56 facilitate relative rotative movement of the collar 48 and the cap 28, and cooperate with the cap 28 to maintain the wings 26 in spaced relation with respect to the chuck bushing 18.

A transverse bore 60 is formed in the coupling extension 50 and a longitudinal bore 62 intersects the transverse bore 60. The longitudinal bore 62 is adapted to form an extension of the bore 64 of the hollow drill steel 54. A plate 66 having an aperture 68 for the reception of the coupling extension 50 and extension 70 forms a closure for the front end of the enlarged bore 38.

A ring shaped member 72 having an annular groove 74 connected with an external source of water supply 76 is adapted to receive the extension 70 of the plate 66. The other end of the ring shaped member 72 is closed by a plate 78 and bolts 80 pass through the plate 78, the plate 66, and the cap 28, thus securing the plate 78, the ring 72, the plate 66 and the cap 28 rigidly together. Packing rings 82 are interposed between the plate 66 and the ring 72 and between the plate 78 and the ring 72.

The operation of the device is as follows: With the drill steel 84 in the position shown in Figure 1, great weight is apt to be thrown onto the rotary parts in the front head of a rock drill unless a device of the nature of that just described is used to convey the weight of the drill steel to the casing parts of the rock drill and thus relieve the rotary parts of the strain. It will be readily seen that the entire weight of the long drill steel rests on the thrust collars 56 and that the thrust collars convey this weight to the shoulder 40 of the cap 28 which in turn carries the weight to the front head 32 of the rock drill where it can do no damage. In order to prevent the water which is used in cleansing the drill hole, and which may be under great pressure, from entering the working parts of the rock drill, the water is led into the hollow drill steel from the external source 76, into the annular ring 74 from which it passes into the transverse bore 60 and thence into the hole 64 of the drill steel 54. The packing rings 82 prevent the escape of water forwardly or rearwardly and thus eliminate the detrimental effects of water in the working parts of the rock drill.

I claim:

1. In a steel support for rock drills, the combination of a rock drill having a front head, a cap adapted to fit over the front head, a longitudinal cylindrical opening in the cap having a reduced portion and an enlarged portion, a shoulder between the reduced portion and the enlarged portion, thrust collars in the enlarged portion resting against the shoulder, a coupling adapted to seat against the thrust collars, a transverse bore in the coupling intersecting a central longitudinal bore, means for conveying water to the transverse bore, a plate forming a closure for the front end of the cap, and a second plate forming a closure for the front end of the water conveying means.

2. In a steel support for rock drills, the combination of a rock drill having a front head, a cap adapted to fit over the front head, a longitudinal cylindrical opening in the cap having a reduced portion and an enlarged portion, a shoulder between the reduced portion and the enlarged portion, a plurality of thrust collars in the enlarged portion resting against the shoulder, a coupling adapted to secure together sections of drill steel, a collar on the coupling, said collar adapted to seat against the thrust collars, a transverse bore in the coupling intersecting a central longitudinal bore, means for conveying water to the transverse bore in the form of a ring surrounding said coupling, an annular groove in said ring, a conduit for conveying water from an external source to said annular groove, a plate forming a closure for the front end of the cap, and a second plate forming a closure for the front end of the water conveying means.

3. In a steel support for rock drills, the combination of a rock drill and a front head therefor, a chuck in the front head, a drill steel coupling extending into the chuck, wings on the drill steel coupling adapted to engage the chuck for preventing relative rotation of said drill steel coupling and the chuck, a chuck bushing in the chuck forming a guide for the drill steel coupling, and guiding means for the coupling seated on the front end of the front head and having a fixed abutment for the drill steel coupling to maintain the wings in predetermined spaced relation with respect to the chuck bushing.

4. In a steel support for rock drills, the combination of a rock drill and a front head therefor, a chuck in the front head, a drill steel coupling extending into the chuck and provided with wings adapted to engage the chuck for preventing relative rotation of said drill steel coupling and the chuck, a chuck bushing in the chuck adapted to slidably receive the drill steel coupling, a collar on the drill steel coupling, a cap seated on the front end of the front head and having an aperture therein to slidably receive said front head, said cap having a fixed abutment for the collar to maintain the wings in predetermined spaced relation with respect to the chuck bushing.

5. In a drill steel support for rock drills, the combination of a rock drill having a front head and a cylinder, side bolts for connecting the front head to the cylinder, a chuck in the front head, a drill steel coupling extending into the chuck and provided with wings adapted to engage the chuck to prevent rotation of said drill steel coupling and the chuck, a chuck bushing in the chuck adapted to slidably receive the drill steel coupling, a collar on the drill steel coupling, a cap adapted to slidably receive the front end of the front head and seated thereagainst, a projection on the cap for engaging a side bolt to prevent relative rotation of the cap and the front head, said cap having fixed bearing means for the collar to positively maintain the wings in predetermined spaced relation with respect to the chuck bushing.

6. In a steel support for rock drills, the combination of a rock drill and a front head therefor, a chuck in the front head, a drill steel coupling extending into the chuck and provided with wings adapted to engage the chuck for preventing relative rotation of the drill steel and the chuck, a chuck bushing in the chuck adapted to slidably receive the drill steel coupling, a collar on the drill steel coupling, a cap adapted to receive the front end of the front head and bearing thereagainst, a bore in the cap and provided with shoulder bearing means for the collar whereby the wings are maintained in predetermined spaced relation with respect to the chuck bushing, and a plate at the front end of the bore adapted to form a bearing for the coupling.

7. In a steel support for rock drills, the combination of a rock drill and a front head therefor, a chuck in the front head, a drill steel comprising a plurality of sections, an end section of the drill steel extending into the chuck and having wings adapted to engage the chuck for preventing relative rotation of the drill steel and the chuck, a chuck bushing in the chuck adapted to slidably receive the drill steel coupling, a coupling for connecting said drill steel section to another drill steel section and having an integral collar, a cap adapted to slidably receive the front end of the front head and bearing thereagainst, a bore in the cap having shoulder means adapted to form an abutment for the collar whereby the wings are maintained in predetermined spaced relation with respect to the chuck bushing, and a plate secured to the forward end of the cap to form a bearing for the coupling.

8. In a drill steel support for rock drills, the combination of a rock drill and a front head therefor, a chuck in the front head, a drill steel section extending into the chuck and provided with wings adapted to engage the chuck for preventing relative rotation of the drill steel coupling and the chuck, a chuck bushing in the chuck adapted to slidably receive the drill steel coupling, a collar on the drill steel coupling, a cap adapted to slidably receive the front end of the front head and bearing thereagainst, a reduced bore and an enlarged bore in the cap forming a shoulder therebetween, and bearing means interposed between the shoulder and the collar, said means cooperating with said cap to maintain the wings in predetermined spaced relation with respect to the chuck bushing.

9. In a drill steel support for rock drills, the combination of a rock drill and a front head therefor, a chuck in the front head, a drill steel coupling extending into the chuck and provided with wings adapted to engage the chuck for preventing relative rotation of said drill steel coupling and the chuck, a chuck bushing in the chuck adapted to slidably receive the drill steel coupling, a collar on the drill steel coupling, a cap adapted to slidably receive the front end of the front head and bearing thereagainst, a rearward reduced bore and a forward enlarged bore in the cap forming a shoulder therebetween, said shoulder serving as a bearing for the collar to maintain the wings in spaced relation with respect to the chuck bushing, a plate forming a closure for the front end of the enlarged bore, a bore in the coupling, means for introducing cleansing fluid to said bore including a ring member encircling the coupling forwardly of said plate, and means for clamping said ring member rigidly to said cap.

In testimony whereof I have signed this specification.

CHARLES C. HANSEN.